UNITED STATES PATENT OFFICE.

FREDERICK LAIST AND FREDERICK F. FRICK, OF ANACONDA, MONTANA.

PROCESS OF RECOVERING ZINC FROM ITS ORES.

1,167,701.  Specification of Letters Patent.  Patented Jan. 11, 1916.

No Drawing.  Application filed September 9, 1915.  Serial No. 49,788.

*To all whom it may concern:*

Be it known that we, FREDERICK LAIST and FREDERICK F. FRICK, citizens of the United States, residing at Anaconda, in the county of Deerlodge and State of Montana, have invented certain new and useful Improvements in Processes of Recovering Zinc from its Ores, of which the following is a specification.

This invention relates to the hydrometallurgical treatment of zinc ores, and is especially adapted to the treatment of so-called complex sulfid ores which are not readily amenable to treatment by the usual processes.

The invention in its preferred embodiment is employed in connection with the cyclical process of extracting zinc from its ores as disclosed in our copending application Serial No. 45,361, filed August 13, 1915; and comprises a more economical method of purifying the zinc-containing solutions, preliminary to their electrolysis for the recovery of the zinc.

According to a preferred embodiment of the present process the sulfid ore or concentrates therefrom, in which the zinc may be associated with lead, iron, manganese, copper, arsenic, antimony, gold, silver, etc., is first roasted under suitable conditions of time and temperature to render the maximum amount of zinc soluble in dilute sulfuric acid. The calcined ore or concentrates, hereinafter referred to as "calcine," is then treated, preferably at a temperature of 50° to 65° C., with sufficient dilute sulfuric acid so that after the completion of the reactions by which the metals of the calcine are dissolved, the solution still contains from one to three per cent. of free acid, under which conditions the filtration is most rapidly and readily accomplished. By this treatment the zinc, copper, iron and manganese pass into solution as sulfates, the iron being commonly present both in the ferrous and ferric states.

It has been found that ferric hydroxid is readily precipitated from these solutions by such basic precipitants as zinc oxid, milk of lime, etc.; but that ferrous hydroxid cannot be thus precipitated. It is accordingly necessary to oxidize the ferrous salt, and this is preferably accomplished through the action of manganese in its higher states of oxidation, as disclosed in our copending application above referred to and as hereinafter more fully described.

The manganese, if not present in the original ores or concentrates in sufficient proportion, may be added thereto in inexpensive forms, such as the carbonate or sulfid; and during the final or electrolytic stage of the process it will be converted into more highly oxidized states, appearing as manganese dioxid, or permanganic acid, or in other states of oxidation higher than the manganous state, in which higher states of oxidation it is returned to the cycle at the appropriate point or points, and in sufficient quantity for the oxidation of the ferrous salts. For this purpose the solutions, after proper purification from salts other than those of zinc and manganese, are electrolyzed with lead or other insoluble anodes at which the oxidation of the manganese takes place, the zinc being at the same time deposited as metal upon the cathodes. Under these conditions the compounds of manganese required for the oxidation of the ferrous iron are regenerated at each repetition of the cycle, either in solution or in suspension, or both, according as the oxidized manganese compounds are soluble or insoluble in the acid solution.

The solution from the leaching operation contains most of the zinc, together with a portion of the copper, silver, iron, manganese, arsenic, antimony and other impurities. Most of the lead and silver remain undissolved and may be separated from the solution, together with the insoluble residue of the calcine, by decantation or filtration. Some of the impurities, and notably iron, must be removed from this clarified solution before electrolysis. According to the present invention this is accomplished by treating the solution for a suitable time, and preferably at a temperature of 50° to 65° C., with an excess of calcine. This calcine carries zinc oxid, and when a sufficient excess is added over that required to neutralize the free acid of the solution, the ferric iron is precipitated as hydroxid:

$$Fe_2(SO_4)_3 + 3ZnO + 3H_2O = 2Fe(OH)_3 + 3ZnSO_4.$$

We find that certain other impurities are also precipitated, and especially the arsenic and antimony, which are probably precipitated as insoluble arsenates and antimonates. These precipitation reactions may be expressed as follows:

$$2H_3AsO_4 + Fe_2(SO_4)_3 + 3ZnO = Fe_2As_2O_8 + 3ZnSO_4 + 3H_2O$$
$$2H_3SbO_4 + Fe_2(SO_4)_3 + 3ZnO = Fe_2Sb_2O_8 + 3ZnSO_4 + 3H_2O$$

It is evident however that ferrous iron may, in the absence of proper precautions, be introduced into the liquor from the calcine used for purification. It is essential to effect the oxidation of this iron in order that it may be removed by precipitation; and for this purpose the required proportion of manganese dioxid derived from the electrolytic stage of the process is introduced at the purifying stage. Manganese dioxid is insoluble in the acid electrolyte, and may be in part settled out and in part carried in suspension. Thus it may be carried back to the leaching stage together with the acid solution, or a portion of that settled out in solid form may be recovered for introduction into the purifying process.

Since the calcines are used in some excess, it is evident that the recovery of zinc therefrom will be low. We have found however that when a calcine resulting from a high zinc concentrate is used, a relatively small amount of residue results from the purification treatment, and that when this residue is mixed in with the raw ore or concentrate and passed through the roasting process, the ferric hydrate therein contained is mostly converted to ferric oxid, which is largely insoluble in dilute sulfuric acid, while the most of the recoverable zinc is unaffected and may be saved. Thus a very satisfactory recovery of the zinc may be made on the calcine used for purification. The resultant solution now contains zinc, manganese, and copper sulfates with possibly small amounts of silver, arsenic and antimony. The copper and traces of other impurities are removed by treatment with metallic zinc, preferably dust.

$$CuSO_4 + Zn = ZnSO_4 + Cu$$
$$As_2(SO_4)_5 + 5Zn = As_2 + 5ZnSO_4$$

The precipitated copper and impurities may be removed by decantation or filtration.

The solution, now purified of elements harmful to electrolysis, is subjected to electrolysis using insoluble anodes and suitable deposition blanks or zinc starting sheets for cathodes. The principal products of electrolysis are metallic zinc, sulfuric acid, manganese dioxid and permanganic acid.

$$ZnSO_4 + current = Zn + SO_4$$
$$SO_4 = SO_3 + O$$
$$SO_3 + H_2O = H_2SO_4$$

It is the above oxygen liberated from the $SO_4$ at the anode which effects the oxidation of the manganese.

$$2MnSO_4 + 2O + 6H_2O = 2HMnO_4 + 2H_2SO_4$$
$$2HMnO_4 + 3MnSO_4 + 2H_2O = 5MnO_2 + 3H_2SO_4$$

One essential advantage of the present process is that the manganese, if not already present in the ores in sufficient proportion, may be added to the raw ore, either on starting or after operation has been established, in such inexpensive forms as the sulfid, carbonate, etc. In the regular operation of the cycle the manganese is recovered in its higher forms of oxidation and is directly available for use both in the leaching and in the purification stages of the process. The present process enables us to secure a high recovery of zinc, permits the employment of the calcine as a precipitant for the iron derived from the original ores while avoiding contamination of the solution by iron introduced with the calcine; and allows the conservation of all of the sulfuric acid used, inasmuch as none of the acid is neutralized by milk of lime.

The term "ore" is used herein to include raw zinc ores, concentrates therefrom, and in general such zinc products as are amenable to the process. The term "oxidized ore" is used to designate ores, including roasted sulfid ores, in which the zinc is present as an oxid or in an oxygen-containing compound.

We claim:

1. A cyclical process of recovering zinc from oxidized ores thereof containing iron, which consists in leaching the ore with an acid reagent, oxidizing the dissolved ferrous salt, purifying the solution by adding thereto an excess of calcine in presence of an agent capable of oxidizing ferrous iron, and electrolytically regenerating the oxidizing agent with simultaneous deposition of metallic zinc.

2. A cyclical process of recovering zinc from oxidized ores thereof containing iron, which consists in leaching the ore with an acid reagent, oxidizing the dissolved ferrous salt, purifying the solution by adding thereto an excess of calcine in presence of manganese dioxid, and electrolytically regenerating the manganese dioxid with simultaneous deposition of metallic zinc.

3. A cyclical process of recovering zinc from oxidized ores thereof containing iron, which consists in leaching the ore with an acid reagent, oxidizing the dissolved ferrous salt by means of a manganese compound in a state of oxidation higher than the manganous state, purifying the solution by means of an excess of calcine in presence of manganese dioxid, and electrolytically regenerating the manganese in its higher states of oxidation with simultaneous deposition of metallic zinc.

In testimony whereof, we affix our signatures in presence of two witnesses.

FREDERICK LAIST.
FREDERICK F. FRICK.

Witnesses:
HIRAM W. RODGERS,
JOSEPHINE MURPHY.

Copies of this patent may be obtained for five cents each, by addressing the "Commissioner of Patents, Washington, D. C."